United States Patent
Lim et al.

(10) Patent No.: US 11,895,219 B2
(45) Date of Patent: Feb. 6, 2024

(54) ARTIFICIAL INTELLIGENCE CALCULATION SEMICONDUCTOR DEVICE AND STORAGE DEVICE COMPRISING THE SAME

(71) Applicant: Samsung Electronics Co., Ltd., Suwon-si (KR)

(72) Inventors: Jin Soo Lim, Seoul (KR); Chang Kyu Seol, Osan-si (KR); Pil Sang Yoon, Hwaseong-si (KR); Ji Youp Kim, Suwon-si (KR); Ju-Young Jung, Cheonan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 232 days.

(21) Appl. No.: 17/136,522

(22) Filed: Dec. 29, 2020

(65) Prior Publication Data

US 2021/0376997 A1    Dec. 2, 2021

(30) Foreign Application Priority Data

May 27, 2020 (KR) .................. 10-2020-0063361

(51) Int. Cl.
*H04L 9/00* (2022.01)
*G06N 20/00* (2019.01)
(Continued)

(52) U.S. Cl.
CPC ............... *H04L 9/008* (2013.01); *G06F 7/50* (2013.01); *G06F 7/5443* (2013.01); *G06N 20/00* (2019.01);
(Continued)

(58) Field of Classification Search
CPC ..... H04L 9/008; H04L 9/0631; H04L 9/0891; H04L 9/30; H04L 2209/122; G06N 20/00; G06F 7/50; G06F 7/5443
See application file for complete search history.

(56) References Cited

U.S. PATENT DOCUMENTS 10,075,288 B1 * 9/2018 Khedr ................ H04L 9/008
10,198,399 B1 * 2/2019 Fritchman ......... G06F 18/24323
(Continued)

FOREIGN PATENT DOCUMENTS

EP    3461054 A1    3/2019

OTHER PUBLICATIONS

Office Action for European Application No. 21154693.2 dated Jun. 29, 2021.
(Continued)

*Primary Examiner* — Noura Zoubair
*Assistant Examiner* — Thomas A Carnes
(74) *Attorney, Agent, or Firm* — Harness, Dickey & Pierce, P.L.C.

(57) ABSTRACT

An artificial intelligence calculation semiconductor device is provided. The artificial intelligence calculation semiconductor device comprising: a control unit; and a MAC (Multiply and Accumulator) calculator which executes a homomorphic encryption calculation through the control unit, wherein the MAC calculator includes an NTT (Numeric Theoretic Transform)/INTT (Inverse NTT) circuit which generates cipher texts by performing a homomorphic multiplication calculation through transformation or inverse transformation of data, a cipher text multiplier which executes a multiplication calculation between the cipher texts, a cipher text adder/subtractor which executes addition and/or subtraction calculations between the cipher texts, and a rotator which performs a cyclic shift of a slot of the cipher texts.

18 Claims, 10 Drawing Sheets

(51) Int. Cl.
  *G06F 7/50* (2006.01)
  *G06F 7/544* (2006.01)
  *H04L 9/06* (2006.01)
  *H04L 9/08* (2006.01)
  *H04L 9/30* (2006.01)
(52) U.S. Cl.
  CPC .......... *H04L 9/0631* (2013.01); *H04L 9/0891* (2013.01); *H04L 9/30* (2013.01); *H04L 2209/122* (2013.01)

(56) References Cited

U.S. PATENT DOCUMENTS

| | | | | |
|---|---|---|---|---|
| 10,298,385 | B2* | 5/2019 | Khedr | H04L 9/0618 |
| 10,541,805 | B2* | 1/2020 | Laine | H04L 9/008 |
| 2009/0234792 | A1* | 9/2009 | Kim | H03M 13/3784 |
| | | | | 706/50 |
| 2013/0216044 | A1* | 8/2013 | Gentry | H04L 9/008 |
| | | | | 380/277 |
| 2017/0293913 | A1* | 10/2017 | Gulak | G06Q 20/3829 |
| 2019/0205875 | A1* | 7/2019 | Gulak | G06Q 20/38215 |
| 2019/0334716 | A1* | 10/2019 | Kocsis | G06N 3/045 |
| 2020/0019867 | A1* | 1/2020 | Nandakumar | G06N 3/048 |
| 2020/0036510 | A1* | 1/2020 | Gomez | G06N 3/045 |
| 2020/0036511 | A1* | 1/2020 | Cheon | H04L 63/0428 |
| 2020/0403781 | A1* | 12/2020 | Gentry | H04L 9/008 |
| 2021/0081807 | A1* | 3/2021 | Tueno | H04L 9/0656 |

OTHER PUBLICATIONS

S. Bian et al. 'ENSEI: Efficient Secure Inference via Frequency-Domain Homomorphic Convolution for Privacy-Preserving Visual Recognition' *Department of Communications and Computer Engineering*, Kyoto University, Mar. 11, 2020, pp. 1-10.

M. A. Neggaz et al. 'Rapid In-Memory Matrix Multiplication Using Associative Processor' *EDAA*, 2018, pp. 985-990.

D. Kim et al. 'Approximate Homomorphic Encryption over the Conjugate-invariant Ring' *IACR, EPO*, 2018, pp. 1-15.

* cited by examiner

ARTIFICIAL INTELLIGENCE CALCULATION SEMICONDUCTOR DEVICE AND STORAGE DEVICE COMPRISING THE SAME

This application claims priority to Korean Patent Application No. 10-2020-0063361, filed on May 27, 2020, and all the benefits accruing therefrom under 35 U.S.C. § 119, the disclosure of which is incorporated herein by reference in its entirety.

BACKGROUND

1. Field of the Invention

The present inventive concepts relate to an artificial intelligence calculation semiconductor device and a storage device including the same.

2. Description of the Related Art

A cloud calculation environment may be provided in which personal information and/or data is stored in a server and a user uses data stored in the server through a user terminal when necessary. When the personal information and/or data are stored on the server, the personal information and/or data may be encrypted to protect the personal information, such as by prevention of data leakage.

In this environment, if the encrypted data is stored in the server, when searching the data and/or performing a task (e.g., through a calculation), because there may be a need to perform the desired searches and/or tasks after decrypting the encrypted data one by one, the search and/or task may be very inefficient, and there may be an increase in possibility that the decrypted personal information and/or data may be leaked to a third party.

In order to solve such a problem, a homomorphic encryption method is widely studied. According to the homomorphic encryption, even if a calculation is performed on a cipher text itself, without decrypting the encrypted information or data, since the same calculation is performed in a plain text and then the same result as the encrypted result is obtained, a calculation may be executed even without decrypting the cipher text.

Recently, a homomorphic encryption method is used in the field of artificial intelligence. A rapid calculation process speed is required in the homomorphic encryption calculation used in the field of artificial intelligence.

SUMMARY

Aspects of the present inventive concepts provide an artificial intelligence calculation semiconductor device having an improved calculation speed.

Aspects of the present inventive concepts also provide an electrical device and a storage device including an artificial intelligence calculation semiconductor device with improved calculation speed.

However, aspects of the present inventive concepts are not restricted to the one set forth herein. The above and other aspects of the present inventive concepts will become more apparent to one of ordinary skill in the art to which the present inventive concepts pertain by referencing the detailed description of the present inventive concept given below.

According to an aspect of the present inventive concepts, there is provided an artificial intelligence calculation semiconductor device comprising: a control unit; and a MAC (Multiply and Accumulator) configured to execute a homomorphic encryption calculation through the control unit, wherein the MAC is configured to generate cipher texts by performing a homomorphic multiplication calculation through transformation or inverse transformation of data, execute a multiplication calculation between the cipher texts, execute addition and/or subtraction calculations between the cipher texts, and perform a cyclic shift of a slot of the cipher texts.

According to an aspect of the present inventive concepts, there is provided an electronic device comprising: a memory device including a data region configured to data; a Central Processor Unit (CPU) configured to control the memory device to transmit and receive the data; and an artificial intelligence calculation semiconductor device configured to execute artificial intelligence calculation by executing a homomorphic encryption calculation, wherein the artificial intelligence calculation semiconductor device includes a Multiply and Accumulator calculator (MAC) configured to generate cipher texts by performing a homomorphic multiplication calculation through transformation or inverse transformation of data, execute a multiplication calculation between the cipher texts, execute addition and/or subtraction calculations between the cipher texts, and perform a cyclic shift of a slot of the cipher texts.

According to an aspect of the present inventive concepts, there is provided a storage device comprising: a nonvolatile memory device including a data region configured to store data; a controller configured to control the nonvolatile memory device to transmit and receive the data; and an artificial intelligence calculation semiconductor device configured to execute an artificial intelligence calculation by executing a homomorphic encryption calculation, wherein the artificial intelligence calculation semiconductor device includes a Multiply and Accumulator calculator (MAC), the MAC configured to generate cipher texts by performing a homomorphic multiplication calculation through transformation or inverse transformation of data, execute a multiplication calculation between the cipher texts, executes addition and/or subtraction calculations between the cipher texts, and performs a cyclic shift of a slot of the cipher texts.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION OF THE EMBODIMENTS

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms "in some example embodiments" and "in an example embodiment" used herein do not necessarily indicate the same embodiment.

Some example embodiments of the present disclosure may be represented by functional blocks and various processing operations. Some or all of such functional blocks may be implemented as various numbers of hardware and/or software components for performing specific functions. For example, the functional blocks of the present disclosure may be implemented using one or more microprocessors, or may be implemented using circuits for predetermined functions. Furthermore, for example, the functional blocks of the present disclosure may be implemented with various programming or scripting languages. The functional blocks may be implemented as algorithms to be executed by one or more processors. Furthermore, the present disclosure may employ typical technologies for electronic environment setting, signal processing, and/or data processing. The terms such as "mechanism," "element," "means", "configuration," and the like may be widely used herein, and are not limited to mechanical and physical configurations.

Figure 1:
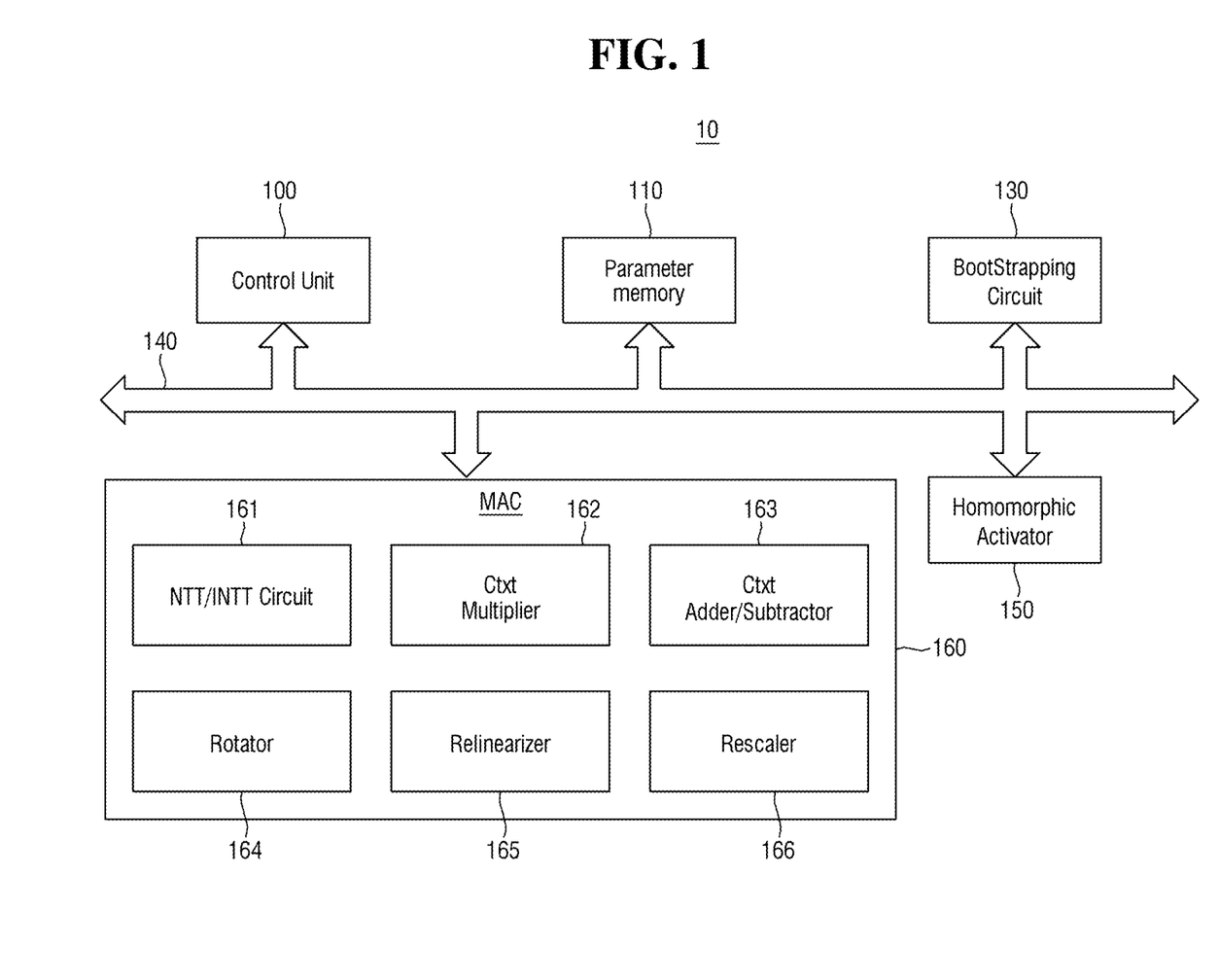
FIG. 1 is an example block diagram showing an artificial intelligence calculation semiconductor device according to some example embodiments.

FIG. 1 is an example block diagram showing an artificial intelligence calculation semiconductor device according to some example embodiments.

Referring to FIG. 1, an artificial intelligence calculation semiconductor device 10, according to some embodiments, includes a control unit 100, a parameter memory 110, a boot strapping circuit 130, a bus 140, a Multiply and Accumulator calculator (MAC) 160, and a homomorphic activator 150.

The control unit 100 may be configured to generally control the operation of the artificial intelligence calculation semiconductor device 10 according. For example, the control unit 100 may interpret a command and/or the like provided from a host (not shown), and control the operation of the artificial intelligence calculation semiconductor device 10 depending on the interpretation result. For example, the control unit 100 may be provided with program command/address/data, and/or the like, from the host and execute an operation according to the command of the artificial intelligence calculation semiconductor device 10.

The parameter memory 110 may be configured to store data which is used by the MAC 160. For example, the parameter memory 110 may store the data used for the calculation of the MAC 160 and transmit the data to the MAC 160 through the bus 140. The data stored in the parameter memory 110 may be weights used, for example, in the artificial intelligence calculation. The data stored in the parameter memory 110 may also be, for example, a parameter value required for the artificial intelligence calculation or an intermediate value of the homomorphic calculation. The parameter memory 110 may comprise, but is not limited to, SRAM (Static Random Access Memory).

The boot strapping circuit 130 may be configured to remove an error generated after key-switching is performed on the data homomorphically encrypted by the MAC 160. For example, the boot strapping circuit 130 may restart the homomorphically encrypted cipher text when the MAC 160 executes the calculation more than a predetermined number of times.

The homomorphic activator 150 may be configured to be used by the MAC 160 to perform a non-linear calculation. For example, the homomorphic activator 150 may be configured to execute the non-linear calculation using the data homomorphically encrypted by the MAC 160 in the artificial intelligence calculation. At this time, the homomorphic activator 150 may execute a non-linear calculation on the homomorphically encrypted data. In order to perform the non-linear calculation on the homomorphically encrypted data, an approximated circuit model may be included in the homomorphic activator 150. The approximated circuit model may be, for example, an approximated model that converts homomorphically encrypted data into a Taylor series. Further, the homomorphic activator 150 may support various non-linear functions such as Rectified Liner Units (ReLU), Gaussian error Liner Units (GeLU), Sigmoid, Tanh, and Square.

The MAC 160 may include an NTT (Numeric Theoretic Transform)/INTT (Inverse NTT) circuit 161, a cipher text multiplier 162, a cipher adder/subtractor 163, a rotator 164, a relinearizer 165, and a rescaler 166.

The NTT/INTT circuit 161 may be configured to process the multiplication calculation of RLWE (Ring Learning With Errors)-based homomorphic cipher text. For example, the NTT/INTT circuit 161 may be configured to efficiently convert data and/or inversely convert the data to simplify the calculation complexity of a polynomial multiplication.

For example, the RLWE-based homomorphic cipher text may be generated in the form of a polynomial. At this time, when performing a multiplication calculation on the RLWE-based homomorphic cipher text in the form of a polynomial, a convolution calculation may be performed. Multiplication between the polynomials may require a large amount of calculation. For example, the multiplication between an n term polynomial and an n term polynomial may require an amount of calculation of $n^2$.

However, when performing the multiplication calculation of the RLWE-based homomorphic cipher text, the NTT/INTT circuit 161 may be configured to perform the NTT transformation on the RLWE-based homomorphic cipher text and then execute the element-wise multiplication. After that, the NTT/INTT circuit 161 may execute the multiplication between the polynomials with a low amount of calculation, by performing the multiplication for each element on the RLWE-based homomorphic cipher text subjected to NTT transformation, and then performing the INTT transformation. For example, by utilizing the NTT/INTT circuit 161, the multiplication between the n term polynomial and the n term polynomial may require only an amount of calculation of $n*\log(n)$.

The cipher text multiplier 162 may be configured to perform the multiplication calculation between RLWE-based homomorphic cipher texts.

The cipher text adder/subtractor 163 may be configured to perform addition and/or subtraction between the RLWE-based homomorphic cipher texts.

The MAC 160, according to some embodiments, may further include a circuit that performs an XOR operation, an XNOR operation, an AND operation, and the like between the cipher texts, without being limited thereto.

The rotator 164 may be configured to perform a cyclic shift on the homomorphic cipher text. For example, the rotator 164 may perform the cyclic shift of the slot of the cipher text. The slot may include a part of the cipher text vectorized by packing data in which homomorphic encryption is executed.

The relinearizer 165 may be configured to reduce the dimension of the cipher text in which the amount of calculation increases through the NTT/INTT circuit 161 and/or the cipher text multiplier 162. For example, the relinearizer 165 may restore the dimension of the cipher text in which the amount of calculation increases through the NTT/INTT circuit 161 and/or the cipher text multiplier 162 to the dimension before multiplication calculation between the cipher texts.

The rescaler 166 may be configured to reduce the dimension of the multiplied cipher text after the multiplication calculation between the cipher texts performed through the NTT/INTT circuit 161 and/or the cipher text multiplier 162. The rescaler 166 may also be configured to execute a rounding process on the multiplied cipher text.

The artificial intelligence calculation semiconductor device 10, according to some embodiments, may have an architecture of a deep neural network (DNN) and/or n-layer neural network. The DNN and/or n-layer neural network may correspond to a convolution neural network (CNN), recurrent neural network (RNN), deep belief network, restricted Boltzmann machine, or the like. For example, the neural network 2 may be implemented as a CNN, an artificial neural network (ANN) system, a deep learning system, deconvolutional neural networks (DCNN), stacked neural networks (SNN), state-space dynamic neural networks (SSDNN), deep belief networks (DBN), generative adversarial networks (GANs), and/or restricted Boltzmann machines (RBM), but is not limited thereto.

Alternatively and/or additionally, such artificial intelligence architecture systems may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests. In some example embodiments, the artificial intelligence architecture systems may include a pooling layer, a fully connected layer, and/or the like in addition to a plurality of convolution layers.

The control unit 100, the boot strapping circuit 130, the homomorphic activator 150, and the MAC 160 may include and/or be included in, for example, processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc. Instructions for the operation of the artificial intelligence calculation semiconductor device 10 may be included in a computer-accessible medium (not shown) for example, a non-transitory memory system. Generally speaking, the term "non-transitory," as used herein, is a limitation of the medium itself (e.g., as tangible, and not a signal) as opposed to a limitation on data storage persistency (e.g., RAM vs. ROM).

Figure 2:
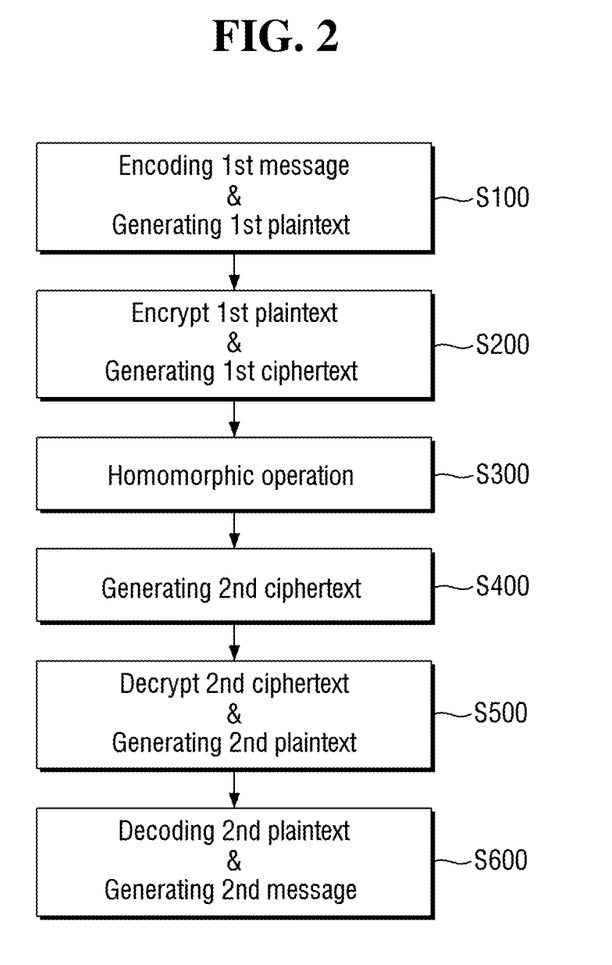
FIG. 2 is an example flowchart for explaining the operation of the artificial intelligence calculation semiconductor device according to some example embodiments.

FIG. 2 is an example flowchart for explaining the operation of the artificial intelligence calculation semiconductor device according to some example embodiments.

Referring to FIGS. 1 and 2, first, a MAC 160 performs encoding on a 1st message, which is a target of homomorphic encryption, to generate a 1st plain text (S100). For example, at this time, the MAC 160 may vectorize and encode the 1st message. This will be further explained as an example through FIG. 3.

Figure 3:
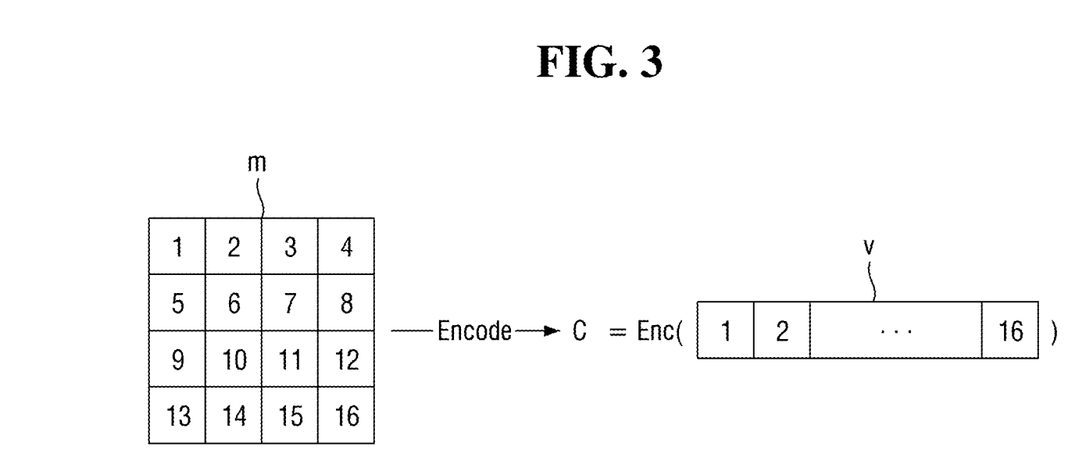
FIG. 3 is an example diagram for explaining an encoding operation of the artificial intelligence calculation semiconductor device according to some example embodiments.

FIG. 3 is an example diagram for explaining an encoding operation of the artificial intelligence calculation semiconductor device according to some example embodiments.

Referring to FIG. 3, encoding may be performed on the 1st message m made up of a 4*4 matrix. At this time, the 1st plain text c may be generated by performing the encoding on the first vector v obtained by vectorizing the 1st message m. The first vector v may be a slot to be rotated by the rotator 164. The 1st plain text c may be formed by packing a plurality of slots.

Referring again to FIGS. 1 and 2, the 1st plain text is encoded to generate a 1st cipher text (S200). For example, a public key and/or a secret key may be used on the 1st plain text to generate a 1st cipher text.

In an example embodiment, a plurality of cipher texts, including the 1st cipher text, may be generated in parallel.

After that, the homomorphic calculation may be executed for some of the plurality of cipher texts (S300). For example, homomorphic multiplication and/or addition/subtraction may be performed on some of the plurality of cipher texts through the NTT/INTT circuit 161, the cipher text multiplier 162, and/or cipher text adder/subtractor 163.

The homomorphic calculation according to some embodiments is not limited thereto, and an XOR operation, an XNOR operation, and/or an AND operation between some of a plurality of cipher texts may be performed.

Among the aforementioned homomorphic calculations, a large amount of calculation may be required to execute the homomorphic multiplication calculation. That is, the calculation speed of the artificial intelligence calculation device may be reduced with an increase in the amount of calculation.

To prevent this problem, rotation is performed through the rotator 164 at the time of the homomorphic calculation of the artificial intelligence calculation semiconductor device 10 according to some embodiments. This will be explained as an example through FIG. 4.

Figure 4:
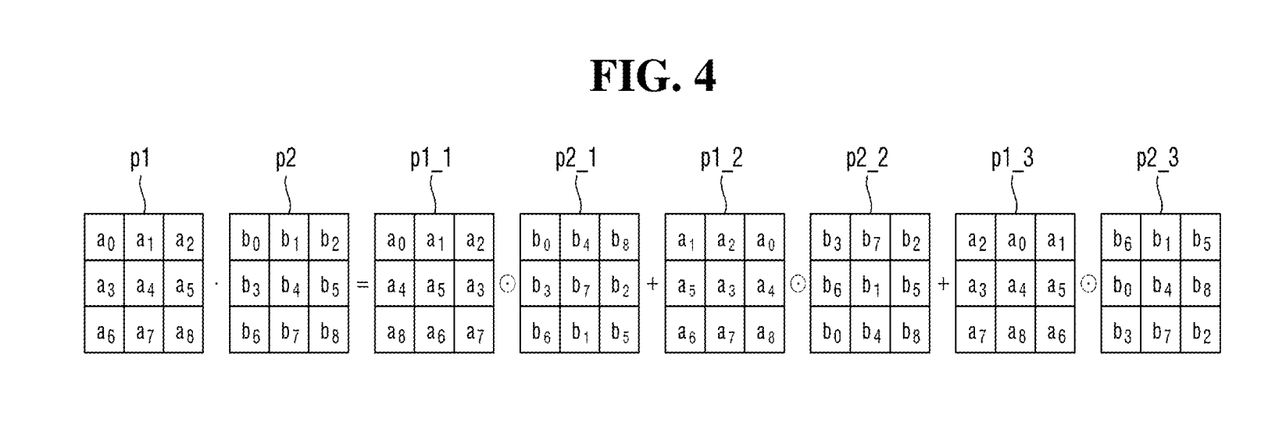
FIG. 4 is an example diagram for explaining some of the calculations of the artificial intelligence calculation semiconductor device according to some example embodiments.

FIG. 4 is an example diagram for explaining some of the calculations of the artificial intelligence calculation semiconductor device according to some example embodiments.

Referring to FIG. 4, when directly performing a homomorphic multiplication calculation (•) between the 1st cipher text p1 with a plurality of slots packed and the 2nd cipher text p2 with a plurality of slots packed, a high amount of calculation may be required.

Therefore, in order to reduce the amount of calculation, first, as shown on a right side of FIG. 4, each rotated cipher text obtained by cyclic shifting of the slots through the rotator 164 for each of the 1st cipher text p1 and the 2nd cipher text p2 is prepared. For example, the cipher text obtained by cyclic shifting of the 1st cipher text p1 through the rotator 164 may include a $1^{st}\_1$ cipher text $p1\_1$, a $1^{st}\_2$ cipher text $p1\_2$, and a $1^{st}\_3$ cipher text $p1\_3$. Further, the cipher text obtained by cyclic shifting of the second cipher text p2 through the rotator 164 may be a $2^{nd}\_1$ cipher text p2_1, a $2^{nd}\_2$ cipher text p2_2, and a $2^{nd}\_3$ cipher text p2_3.

After that, it is possible to perform a simple matrix multiplication calculation (⊙) between the respective rotated cipher texts. For example, the $1^{st}\_1$ cipher text p1_1 and the $2^{nd}\_1$ cipher text p2_1 may be multiplied, the $1^{st}\_2$ cipher text p1_2 and the $2^{nd}\_2$ cipher text p2_2 may be multiplied, and the $1^{st}\_3$ cipher text p1_3 and the $2^{nd}\_3$ cipher text p2_3 may be multiplied.

Finally, the addition calculation (+) may be executed on the values obtained by the simple matrix multiplication calculation (⊙) between each of the rotated cipher texts. For example, the value obtained by multiplying the $1^{st}\_1$ cipher text p1_1 and the $2^{nd}\_1$ cipher text p2_1, the value obtained by multiplying the $1^{st}\_2$ cipher text p1_2 and the $2^{nd}\_2$ cipher text p2_2, and the value obtained by multiplying the $1^{st}\_3$ cipher text p1_3 and the $2^{nd}\_3$ cipher text p2_3 may be added together.

As described above, after performing a cyclic shift of each cipher text through the rotator 164, a simple matrix multiplication may be executed, and the values subjected to the simple matrix multiplication are added, thereby reducing the amount of calculation used for the multiplication calculation between the cipher texts.

Referring again to FIGS. 1 and 2, a 2nd cipher text may be obtained through the homomorphic calculation (S400). After that, the 2nd cipher text may be decrypted to generate a 2nd plain text (S500). Finally, the 2nd plain text may be decoded to generate a 2nd message (S600).

Figure 5:
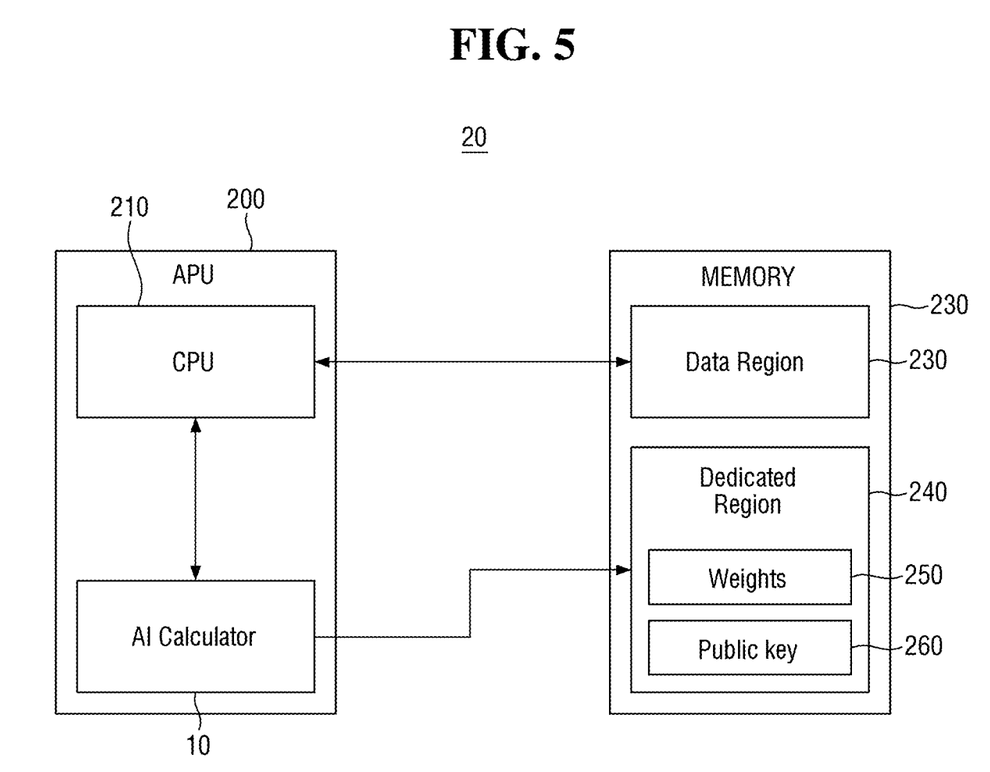
FIGS. 5 and 6 are example block diagrams for explaining a mobile device including an artificial intelligence calculation semiconductor device according to some example embodiments.
Figure 6:
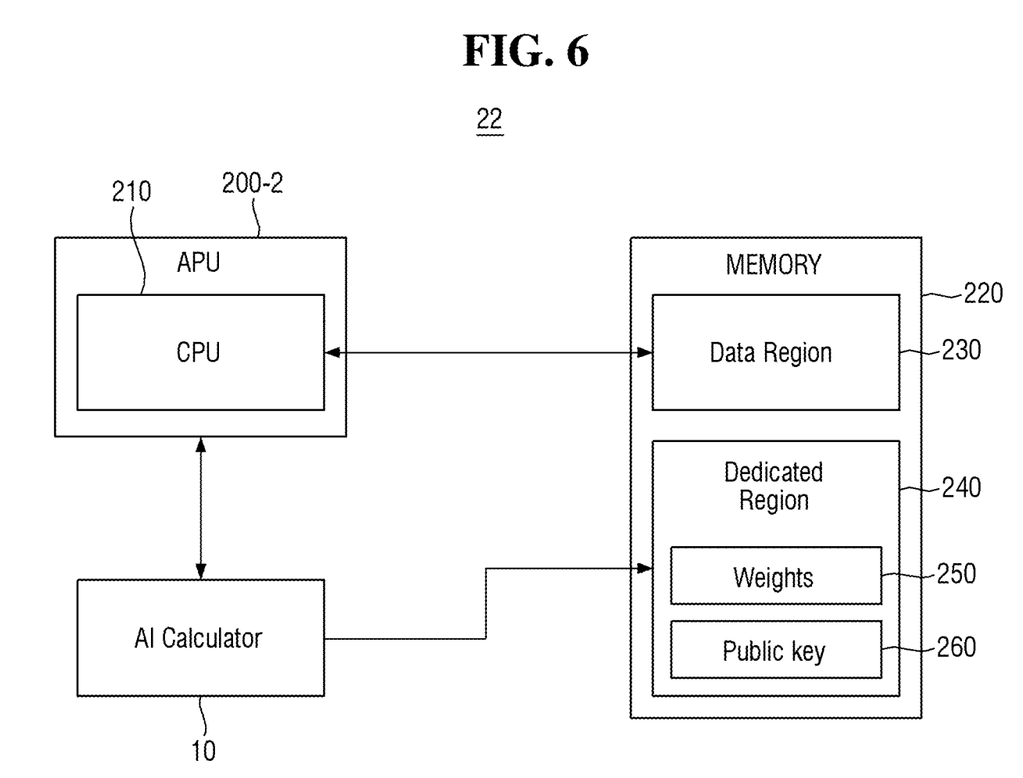

FIGS. 5 and 6 are example block diagrams for explaining an electronic device including an artificial intelligence calculation semiconductor device according to some example embodiments.

The electronic device 20 and/or 22 may be, for example, a mobile electronic device like a mobile phone, a mobile computer, a wearable computer, a tablet computer, a laptop computer, personal digital assistant, and/or the like.

Referring to FIG. 5, an electronic device 20 including the artificial intelligence semiconductor device 10, according to some embodiments, includes an APU (Application Processing Unit) 200 and a memory 230.

The APU 200 may include a CPU (Central Processing Unit) 210 and the artificial intelligence calculation semiconductor device 10 according to some embodiments.

The CPU 210 may be configured to control the APU 200, and/or to control the artificial intelligence calculation semiconductor device 10 according to some embodiments. For example, the CPU 210 may execute software for controlling the APU 200 and/or the artificial intelligence calculation semiconductor device 10, and may perform various data processes and/or calculations. To this end, the CPU 210 may load various data from a data region 230 in the memory 230. Alternatively, the CPU 210 may write various data in the data region 230 of the memory 230.

The memory 220 may include, but is not limited to, a nonvolatile memory. A partial region of the memory 220 may be allocated to a data region 230 for storing data transmitted and received to and from the CPU 210. When the homomorphic encryption is performed, since the dimension of the cipher text becomes relatively larger than that of the plain text, by allocating a dedicated region 240, the homomorphic encryption may be performed more efficiently. Another partial region of the memory 220 may be allocated to the dedicated region 240 for transmitting and receiving data to and from the artificial intelligence calculation semiconductor device 10 according to some embodiments.

By dividing the memory 220 into the data region 230 and the dedicated region 240, different encryptions may be processed in parallel. For example, a Rivest-Shamir-Adleman (RSA) encryption and the homomorphic encryption may be processed in parallel.

The dedicated region 240 may include, for example, a region 250 for storing weights necessary for the artificial intelligence calculation, and/or a region 260 for storing a public key.

However, the configuration of the electronic device 20 including the artificial intelligence calculation semiconductor device 10 according to some embodiments is not limited thereto.

For example, referring to FIG. 6, in an electronic device 22 including the artificial intelligence calculation semiconductor device 10, according to some embodiments, the artificial intelligence calculation semiconductor device 10 may be outside the APU 200-2.

In the electronic device 20 and 22, the artificial intelligence calculation semiconductor device 10 may be configured to operate with the APU 200 and 200-2, and/or independently from the APU 200 and 200-2.

FIGS. 7 to 10 are example block diagrams for explaining a storage device including the artificial intelligence calculation semiconductor device according to some example embodiments.

For reference, a storage device including the artificial intelligence semiconductor device 10, according to some embodiments may be implemented as, but is not limited to, a smart card, an SD (secure digital) card, a multimedia card (MMC), an embedded MMC (eMMC), an embedded multi-chip package (eMCP), a PPN (perfect page NAND), a universal flash storage (UFS), a USB flash drive, a solid state drive (SSD) and/or an embedded SSD (eSSD).

Figure 7:
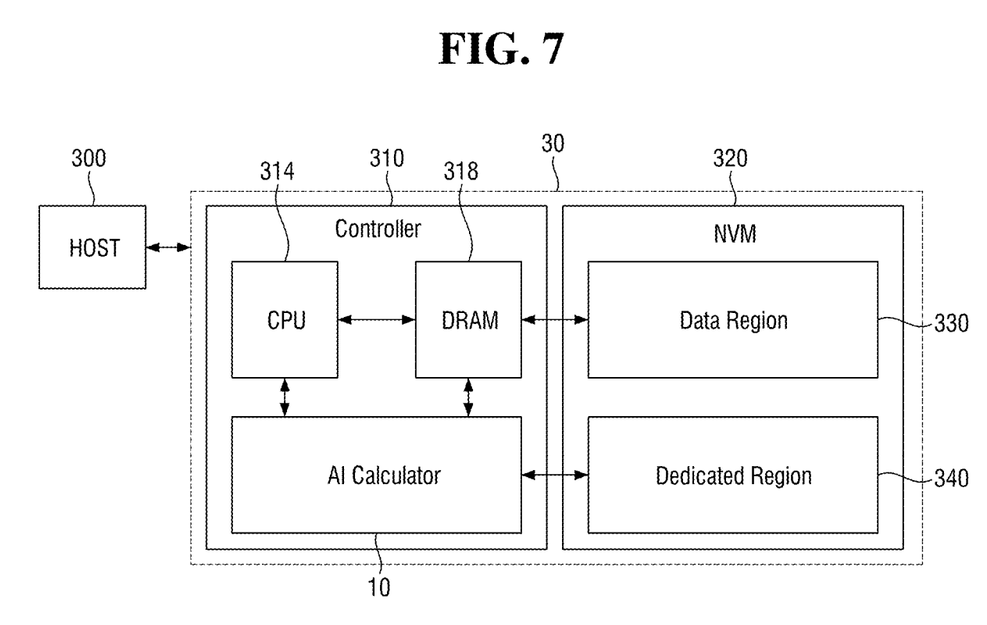
FIGS. 7 to 10 are example block diagrams for explaining a storage device including the artificial intelligence calculation semiconductor device according to some example embodiments.

Referring to FIG. 7, a storage device 30 including the artificial intelligence calculation semiconductor device according to some embodiments may include a controller 310 and a nonvolatile memory device 320.

The controller 310 may be configured to interpret a command, or the like, from a host 300, and to control the operation of the storage device 30 including the artificial intelligence calculation semiconductor device 10 according to some embodiments, depending on the interpretation results. For example, the controller 310 may be provided with the program command/address/data from the host 300, and may store the data in the address of the storage device 30 including the artificial intelligence calculation semiconductor device 10. Further, the controller 310 may be configured to receive read command/address, and the like, from the host 300, and to read and output the data, which are stored in the address of the storage device 30 including the artificial intelligence calculation semiconductor device 10, from the nonvolatile memory device 320.

The controller 310 may include a CPU 314, a DRAM 318, and the artificial intelligence calculation semiconductor device 10 according to some example embodiments.

The CPU 314 may be configured to control the operation of the artificial intelligence calculation semiconductor device 10 by interpreting the command, or the like, received from the host 300.

The artificial intelligence calculation semiconductor device 10, according to some embodiments, may be configured to execute the homomorphic encryption operation through the control of the CPU 314. At this time, according to some embodiments, data used by the artificial intelligence calculation semiconductor device 10 may be stored in the DRAM 318. For example, the DRAM 318 may be configured to store data used for homomorphic encryption calculation of the artificial intelligence calculation semiconductor device 10, and re-transmit the stored data to the artificial intelligence calculation semiconductor device 10.

A part of the nonvolatile memory device (NVM) 320 may be allocated to a data region 330. Another part of the nonvolatile memory device 320 may be allocated to a dedicated region 340.

The data region 330 and the dedicated region 340 may be configured to include the same and/or different forms from each other. For example, the data region 330 may be configured to include a MLC (Multi Level Cell), and the dedicated region 340 may be configured to include a SLC (Single Level Cell). However, the embodiment is not limited thereto, and the data region 330 may be configured to include a TLC (Triple Level Cell) and the dedicated region 340 may be configured to include an MLC (Multi Level Cell). Alternatively, the data region 330 may be configured to include a TLC (Triple Level Cell), and the dedicated region 340 may be configured to include an SLC (Single Level Cell).

In an example embodiment, the data region 330 may be configured to store data that is not used for the calculation of the artificial intelligence calculation semiconductor device 10, while the dedicated region 340 may be configured to store some of the data of the DRAM 318. The data stored in the dedicated region 340 may be, for example, weights used for the artificial intelligence calculation.

Figure 8:
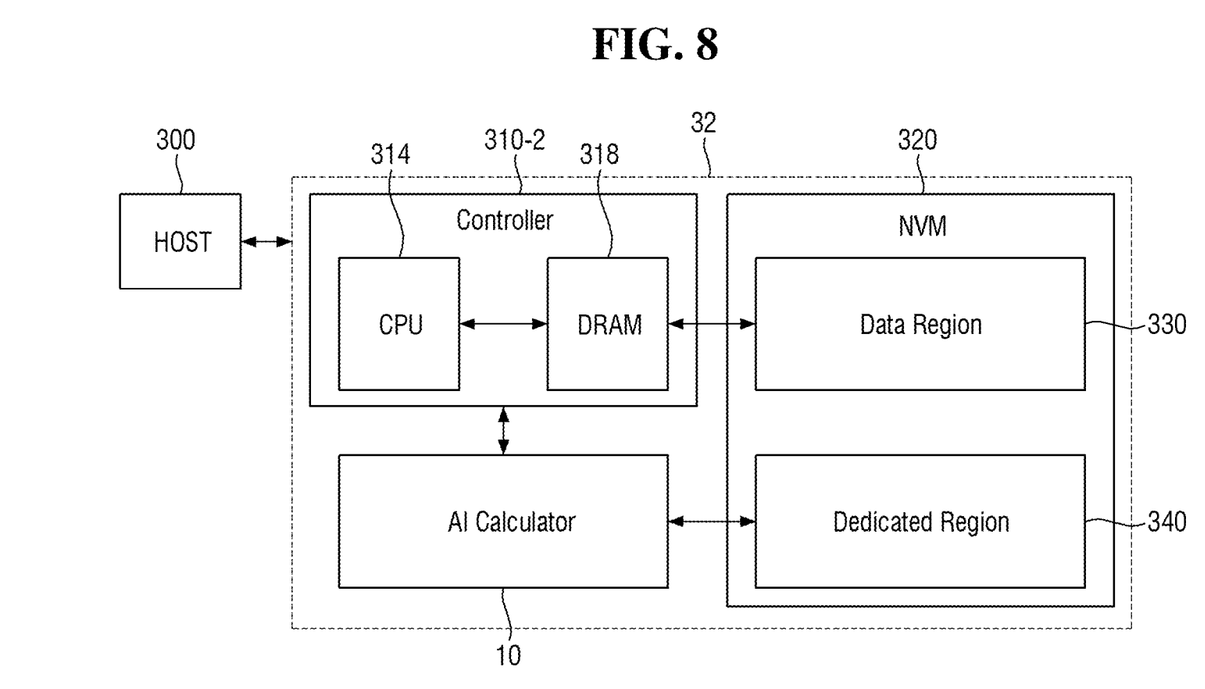

Referring to FIG. 8, in a storage device 32 including the artificial intelligence calculation semiconductor device 10, according to some embodiments. In describing FIG. 8, descriptions that overlap with those of FIG. 7 will be omitted. In the storage device 32, the artificial intelligence calculation semiconductor device 10 may be separate from and/or disposed outside the controller 310-2, unlike the storage device 30 including the artificial intelligence calculation semiconductor device 10 according to the example embodiments of FIG. 7.

Figure 9:
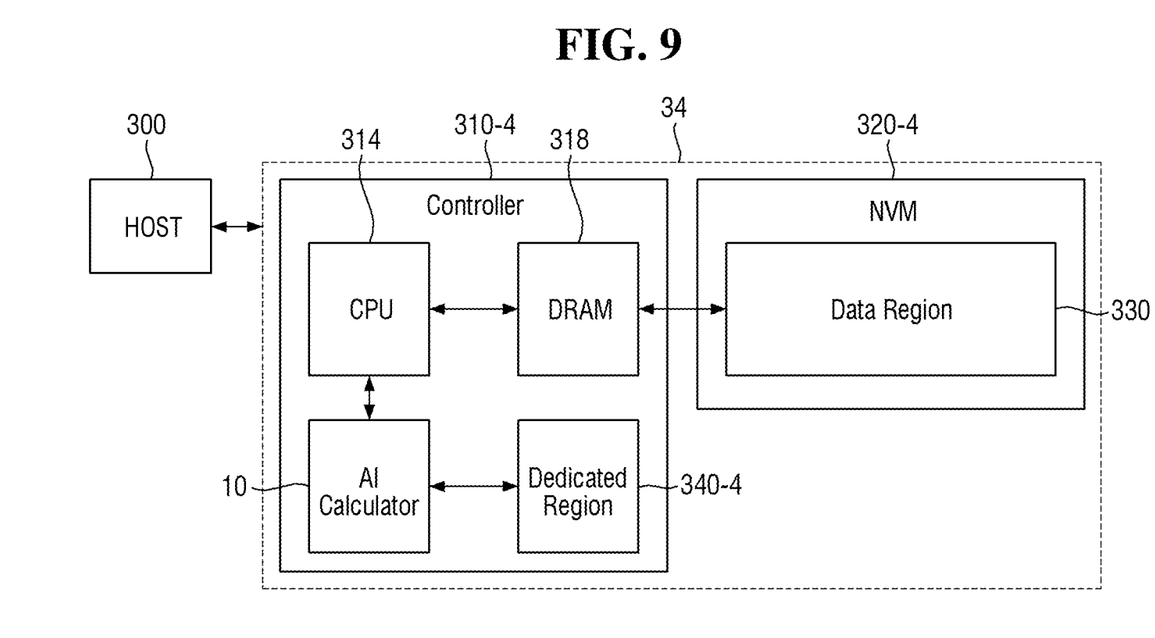

Referring to FIG. 9, in a storage device 34 including the artificial intelligence calculation semiconductor device 10, according to some embodiments. In describing FIG. 9, descriptions that overlap with those of FIGS. 7 and 9 will be omitted. In the storage device 34 a dedicated region 340-4 may be located inside the controller 310-4, unlike the storage device 30 including the artificial intelligence calculation semiconductor device 10 according to the example embodiments of FIG. 7. For example, the controller 310 may include a non-transitory memory including the dedicated region 340. A nonvolatile memory device 320-4 may be allocated to a data region 330, unlike the nonvolatile memory device 320 including the data region 330 and the dedicated region 340 according to some embodiments to FIG. 7.

Figure 10:
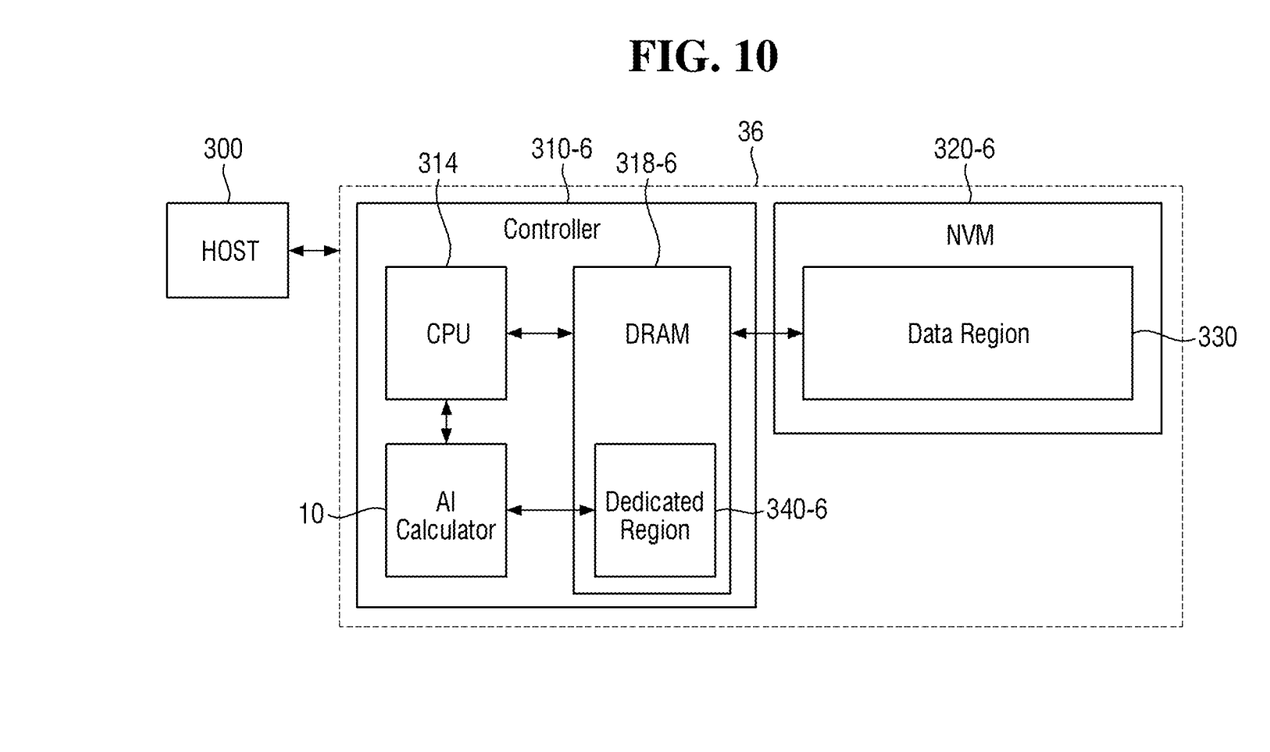

Referring to FIG. 10, in a storage device 36 including the artificial intelligence calculation semiconductor device 10, according to some embodiments, the dedicated region 340-6 may be located inside the DRAM 318-6, unlike the storage device 34 including the artificial intelligence calculation semiconductor device 10 according to the example embodiments of FIG. 9. In the storage device 36 the artificial intelligence calculation semiconductor device 10 may be located inside the controller 310-6, unlike the storage device 32 including the artificial intelligence calculation semiconductor device 10 according to the example embodiments of FIG. 8. A nonvolatile memory device 320-6 may be the nonvolatile memory device 320-4 according to some embodiments to FIG. 9.

In concluding the detailed description, those skilled in the art will appreciate that many variations and modifications may be made to the preferred embodiments without substantially departing from the principles of the present inventive concepts. Therefore, the disclosed preferred embodiments of the invention are used in a generic and descriptive sense only and not for purposes of limitation.

What is claimed is:

1. An artificial intelligence calculation semiconductor device comprising:
a control unit; and
a Multiply and Accumulator calculator (MAC) configured to execute a homomorphic encryption calculation through the control unit,
wherein the MAC is configured to
generate second cipher texts by performing a homomorphic multiplication calculation through transformation or inverse transformation of data by:
obtaining a plurality of rotated cipher texts by performing a cyclic shift of slots of each cipher text of a plurality of cipher texts, where the slots include a part of each cipher text of the plurality of cipher texts vectorized by packing data in which the homomorphic encryption calculation is executed,
executing a multiplication calculation between rotated cipher texts, of the plurality of rotated cipher texts, to obtain a plurality of multiplied cipher texts, where at least two of the rotated cipher texts are multiplied together, and
executing addition and subtraction calculations on the plurality of multiplied cipher texts, and
wherein the artificial intelligence calculation semiconductor device transmits and receives data from an artificial intelligence calculation dedicated region of a memory device comprising a data region different from the dedicated region, the dedicated region configured to store parameter values used for executing, by the MAC, the homomorphic encryption calculation in parallel with different homomorphic encryption calculations.

2. The artificial intelligence calculation semiconductor device of claim 1, further comprising:
a boot strapping circuit configured to remove an error in the plurality of cipher texts or the second cipher texts.

3. The artificial intelligence calculation semiconductor device of claim 1, further comprising:
a homomorphic activator configured to process a non-linear calculation on the plurality of cipher texts or the second cipher texts.

4. The artificial intelligence calculation semiconductor device of claim 3, wherein the homomorphic activator is configured to generate an approximated value of the non-linear calculation through a combination of a cipher text subjected to the multiplication calculation and a cipher text subjected to the addition or subtraction calculation.

5. The artificial intelligence calculation semiconductor device of claim 1, wherein the MAC is further configured to reduce a magnitude of the plurality of cipher texts or the second cipher texts.

6. The artificial intelligence calculation semiconductor device of claim 1, wherein the MAC is further configured to reduce a dimension of the plurality of cipher texts or the second cipher texts and exchange a relinear key.

7. The artificial intelligence calculation semiconductor device of claim 1, further comprising:

a parameter memory configured to store at least one of parameter values for the artificial intelligence calculation and an intermediate value of the homomorphic encryption calculation.

8. The artificial intelligence calculation semiconductor device of claim 7, wherein the parameter memory is an SRAM.

9. The artificial intelligence calculation semiconductor device of claim 7, wherein the parameter value is a weight.

10. The artificial intelligence calculation semiconductor device of claim 7, wherein the parameter value is homomorphically encrypted and stored in the parameter memory.

11. The artificial intelligence calculation semiconductor device of claim 7, wherein the parameter value is stored as a plain text in the parameter memory.

12. An electronic device comprising:
a memory device including a data region configured to store data;
a Central Processor Unit (CPU) configured to control the memory device to transmit and receive the data; and
an artificial intelligence calculation semiconductor device configured to execute artificial intelligence calculation by executing a homomorphic encryption calculation,
wherein the artificial intelligence calculation semiconductor device includes a Multiply and Accumulator calculator (MAC), the MAC configured to
generate second cipher texts by performing a homomorphic multiplication calculation through transformation or inverse transformation of data by:
obtaining a plurality of rotated cipher texts by performing a cyclic shift of slots of each cipher text of a plurality of cipher texts, where the slots include a part of each cipher text of the plurality of cipher texts vectorized by packing data in which the homomorphic encryption calculation is executed,
executing a multiplication calculation between rotated cipher texts, of the plurality of rotated cipher texts, to obtain a plurality of multiplied cipher texts, where at least two of the rotated cipher texts are multiplied together, and
executing addition and subtraction calculations on the plurality of multiplied cipher texts, and
wherein the artificial intelligence calculation semiconductor device transmits and receives data from an artificial intelligence calculation dedicated region of the memory device, the dedicated region different from the data region of the memory device, the dedicated region configured to store parameter values used for executing, by the MAC, the homomorphic encryption calculation in parallel with different homomorphic encryption calculations.

13. The electronic device of claim 12, wherein the parameter values include a weight and a public key.

14. The electronic device of claim 12, wherein the artificial intelligence calculation semiconductor device further includes
a boot strapping circuit configured to remove an error in the plurality of cipher texts or the second cipher texts, and
a homomorphic activator configured to process a non-linear calculation on the plurality of cipher texts or the second cipher texts.

15. The electronic device of claim 14, wherein the MAC is further configured to
reduce a dimension of the plurality of cipher texts or the second cipher texts, and
reduce the dimension of the plurality of cipher texts or the second cipher texts and exchange a relinear key.

16. A storage device comprising:
a nonvolatile memory device including a data region configured to store data;
a controller configured to control the nonvolatile memory device to transmit and to receive the data; and
an artificial intelligence calculation semiconductor device configured to execute an artificial intelligence calculation by executing a homomorphic encryption calculation,
wherein the artificial intelligence calculation semiconductor device includes a Multiply and Accumulator calculator (MAC), and
wherein the MAC is configured to generate second cipher texts by performing a homomorphic multiplication calculation through transformation or inverse transformation of data by:
obtaining a plurality of rotated cipher texts by performing a cyclic shift of slots of each cipher text of a plurality of cipher texts, where the slots include a part of each cipher text of the plurality of cipher texts vectorized by packing data in which the homomorphic encryption calculation is executed,
executing a multiplication calculation between rotated cipher texts, of the plurality of rotated cipher texts, to obtain a plurality of multiplied cipher texts, where at least two of the rotated cipher texts are multiplied together, and
executing addition and subtraction calculations between the plurality of multiplied cipher texts, and
wherein the artificial intelligence calculation semiconductor device transmits and receives data from an artificial intelligence calculation dedicated region of the nonvolatile memory device, the dedicated region different from the data region of the nonvolatile memory device, the dedicated region configured to store parameter values used for executing, by the MAC, the homomorphic encryption calculation in parallel with different homomorphic encryption calculations.

17. The storage device of claim 16, wherein the data region is configured to include a MLC (Multi Level Cell), and
the artificial intelligence calculation dedicated region is configured to include an SLC (Single Level Cell).

18. The storage device of claim 16, wherein the artificial intelligence calculation semiconductor device further includes
a boot strapping circuit configured to remove an error in the plurality of cipher texts or the second cipher texts, and
a homomorphic cultivator configured to process a non-linear calculation on the plurality of cipher texts or the second cipher texts, and
wherein the MAC is further configured to reduce a dimension of the plurality of cipher texts or the second cipher texts, and to reduce the dimension of the plurality of cipher texts or the second cipher texts and exchange a relinear key.

* * * * *